(12) United States Patent
Huf et al.

(10) Patent No.: US 11,440,442 B2
(45) Date of Patent: Sep. 13, 2022

(54) VEHICLE SEAT CONSOLE, VEHICLE SEAT, AND VEHICLE

(71) Applicant: Bayerische Motoren Werke Aktiengesellschaft, Munich (DE)

(72) Inventors: Andreas Huf, Neusaess (DE); Klaus Hufnagl, Munich (DE); Sylvia Kleindl, Munich (DE); Fabian Koehler, Valley (DE); Robert Martin, Munich (DE); Robert Painer, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 401 days.

(21) Appl. No.: 16/687,879

(22) Filed: Nov. 19, 2019

(65) Prior Publication Data

US 2020/0086770 A1   Mar. 19, 2020

Related U.S. Application Data

(63) Continuation of application No. PCT/EP2018/063579, filed on May 23, 2018.

(30) Foreign Application Priority Data

May 23, 2017   (DE) ..................... 10 2017 208 689.0

(51) Int. Cl.
*B60N 2/12*    (2006.01)
*B60N 2/015*   (2006.01)
(Continued)

(52) U.S. Cl.
CPC .............. *B60N 2/12* (2013.01); *B60N 2/015* (2013.01); *B60N 2/0232* (2013.01); *B60N 2/10* (2013.01); *B60N 2/1878* (2013.01); *B60N 2/643* (2013.01)

(58) Field of Classification Search
CPC ........ B60N 2/015; B60N 2/0232; B60N 2/04; B60N 2/045; B60N 2/10; B60N 2/12; B60N 2/16; B60N 2/181
(Continued)

(56) References Cited

U.S. PATENT DOCUMENTS

| 5,358,308 A | 10/1994 | Judic et al. |
| 5,979,985 A | 11/1999 | Bauer et al. |

(Continued)

FOREIGN PATENT DOCUMENTS

| CN | 104139717 A | 11/2014 |
| CN | 104981374 A | 10/2015 |

(Continued)

OTHER PUBLICATIONS

International Search Report (PCT/ISA/210) issued in PCT Application No. PCT/EP2018/063579 dated Aug. 8, 2018 with English translation (five pages).

(Continued)

*Primary Examiner* — Jason S Daniels
(74) *Attorney, Agent, or Firm* — Crowell & Moring LLP

(57) ABSTRACT

A vehicle seat console for a vehicle seat has a seat part and a backrest which is attached thereto and which can be moved out of a substantially upright seating position into a rest or reclined position. The vehicle seat console has at least one vehicle structure-side securing element which is connected or can be connected to a vehicle structure and a seat-side securing element which is connected to or can be connected to the vehicle seat. The seat-side securing element is coupled to the vehicle structure-side securing element via an asymmetrically acting height adjustment device such that the seat-side securing element can be tilted about a transverse axis.

12 Claims, 1 Drawing Sheet

(51) Int. Cl.
  *B60N 2/02* (2006.01)
  *B60N 2/10* (2006.01)
  *B60N 2/18* (2006.01)
  *B60N 2/64* (2006.01)

(58) Field of Classification Search
  USPC .............................. 296/65.01, 65.07, 65.08
  See application file for complete search history.

(56) References Cited

U.S. PATENT DOCUMENTS

| | | | | |
|---|---|---|---|---|
| 6,036,266 | A * | 3/2000 | Massara | B60N 2/1878 297/DIG. 8 |
| 10,549,670 | B1 * | 2/2020 | Smith | B60N 2/3031 |
| 2004/0026964 | A1 | 2/2004 | Edrich et al. | |
| 2009/0206643 | A1 * | 8/2009 | Yamamoto | B60N 2/1864 297/313 |
| 2010/0060061 | A1 * | 3/2010 | Koga | B60N 2/165 297/344.1 |
| 2014/0332656 | A1 * | 11/2014 | Maurer | B60N 2/0722 248/548 |
| 2014/0361592 | A1 | 12/2014 | Kuno | |
| 2015/0375637 | A1 | 12/2015 | Kikuchi et al. | |
| 2020/0101868 | A1 * | 4/2020 | Kim | B60N 2/14 |
| 2021/0114493 | A1 * | 4/2021 | Huf | B60N 2/34 |

FOREIGN PATENT DOCUMENTS

| | | |
|---|---|---|
| DE | 28 36 005 A1 | 2/1980 |
| DE | 3643729 A1 | 7/1988 |
| DE | 38 43 684 A1 | 7/1990 |
| DE | 36 43 729 C2 | 8/1995 |
| DE | 196 46 470 A1 | 5/1998 |
| DE | 100 14 154 C1 | 6/2001 |
| EP | 0 575 243 A1 | 12/1993 |
| EP | 1 346 872 A1 | 9/2003 |
| JP | 2008-81067 A | 4/2008 |

OTHER PUBLICATIONS

German-language Written Opinion (PCT/ISA/237) issued in PCT Application No. PCT/EP2018/063579 dated Aug. 8, 2018 (five pages).

German-language Search Report issued in counterpart German Application No. 10 2017 208 689.0 dated Jan. 19, 2018 with partial English translation (14 pages).

Chinese-language Office Action issued in Chinese Application No. 201880024451.5 dated Jun. 3, 2021 with English translation (nine (9) pages).

* cited by examiner

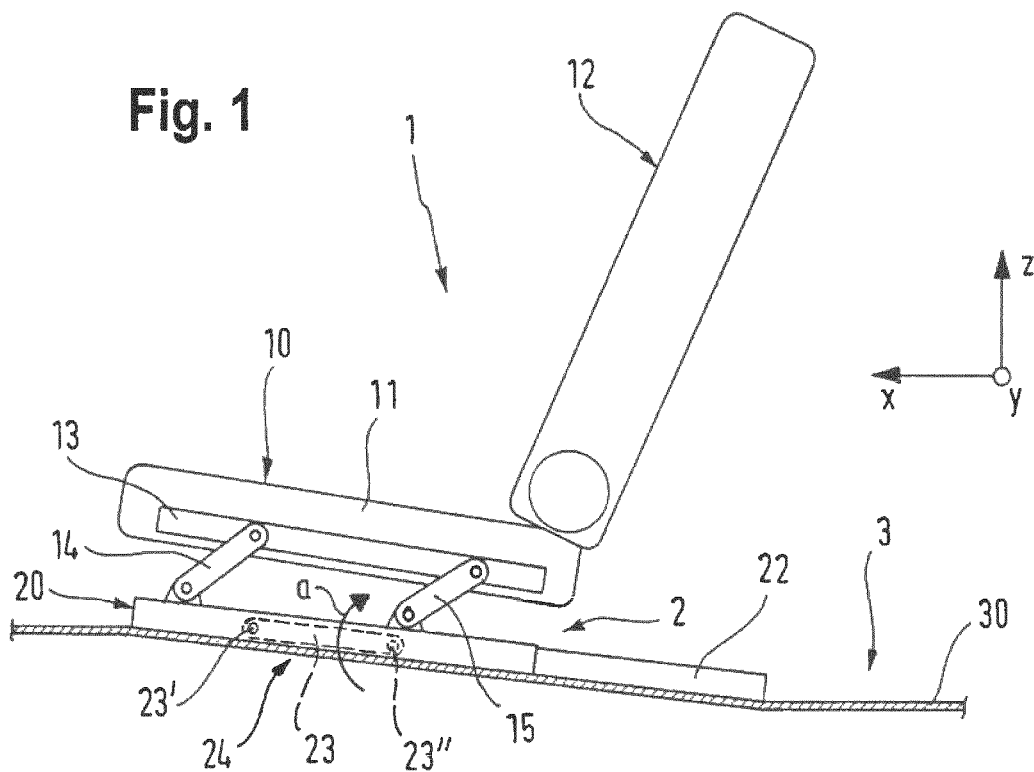
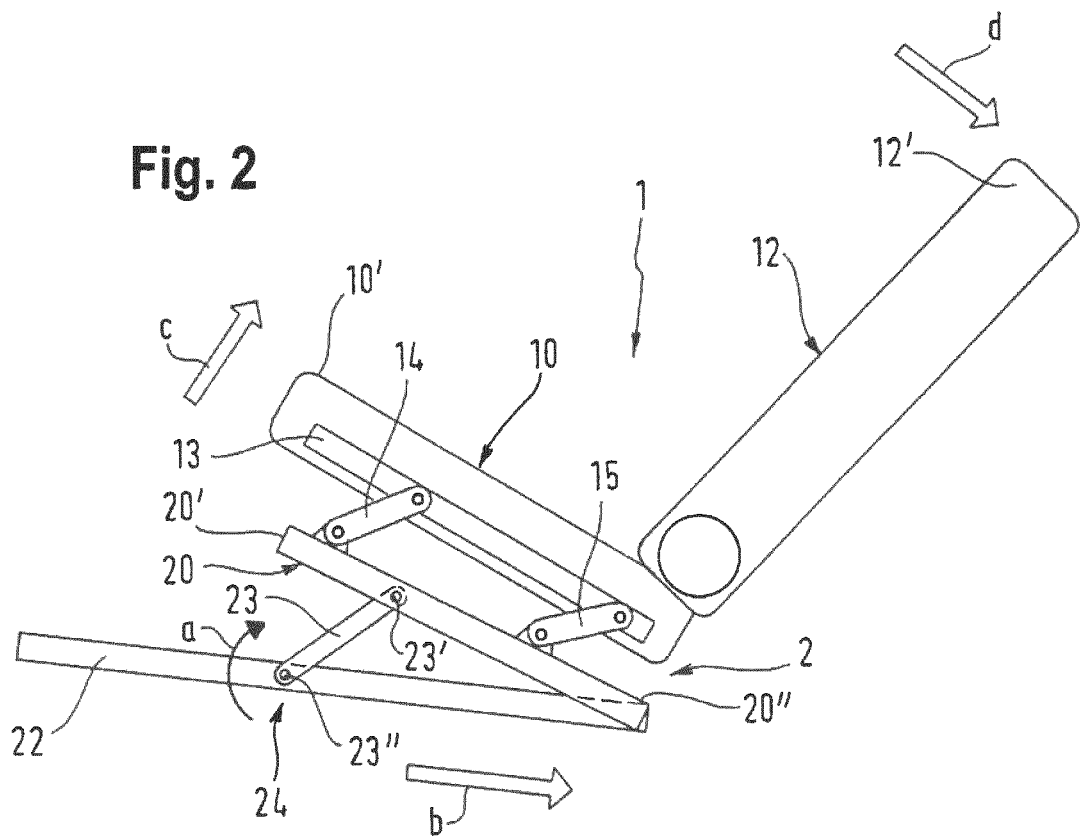

VEHICLE SEAT CONSOLE, VEHICLE SEAT, AND VEHICLE

CROSS REFERENCE TO RELATED APPLICATIONS

This application is a continuation of PCT International Application No. PCT/EP2018/063579, filed May 23, 2018, which claims priority under 35 U.S.C. § 119 from German Patent Application No. 10 2017 208 689.0, filed May 23, 2017, the entire disclosures of which are herein expressly incorporated by reference.

BACKGROUND AND SUMMARY OF THE INVENTION

The invention relates to a vehicle seat console for a vehicle seat having a seat part and a backrest which is attached thereto and which can be moved out of a substantially upright sitting position into a rest or reclined position. It furthermore relates to a vehicle seat having such a console. Moreover, the invention relates to a vehicle with such a vehicle seat.

Vehicle seats are supposed to position vehicle passengers comfortably in the vehicle. Moreover, the vehicle seat provided as the driver's seat must be adjustable so that tall and short persons can reach the steering wheel and the foot pedals by appropriate adapting of the seat position. For this, length, height and backrest tilt adjustments are provided. The length adjustability in the case of vehicle seats is usually assured by mounting the seat on seat rails. It is often also required to enable a resting or reclining position of the vehicle seat for passengers not involved in driving the vehicle. While it is known how to adjust the backrest of the vehicle seat at a shallower angle for a reclining seat position or a comfortably back-tilted sitting position, usually the seat bottom, i.e., the seat part on which the person is sitting, will remain in the same position as for an upright backrest. In order to assume the most comfortable possible rest or reclining position, however, the seat part of the vehicle seat should also be raised up by its front end, facing away from the backrest. While it is basically possible to use a seat inclination adjustment which is present in many vehicle seats to adjust the inclination of the seat cushion independently of the backrest inclination, such a separate movement of seat bottom and backrest into a rest or reclining position makes it difficult to later return the seat to an upright sitting position.

The problem which the present invention proposes to solve is therefore to design a vehicle seat console of this kind so that an inclining of the entire vehicle seat connected to the vehicle seat console is possible quickly and without complications. Furthermore, a corresponding vehicle seat should be indicated.

The vehicle seat console according to the invention for a vehicle seat is provided with a seat part and a backrest which is attached thereto, and the vehicle seat can be moved out of a substantially upright sitting position into a rest or reclined position, wherein the vehicle seat console has at least one vehicle structure-side securing element which is connected or can be connected to a vehicle structure and a seat-side securing element which is connected or can be connected to the vehicle seat, and it is characterized in that the seat-side securing element is coupled to the vehicle structure-side securing element via an asymmetrically acting height adjustment device such that the seat-side securing element can be tilted about a transverse axis. The term "asymmetrical" means here that the height of the seat part can be adjusted differently with respect to the vehicle structure in the front region of the seat part, facing away from the backrest, as compared to the rear region of the seat part near the backrest.

The design of the vehicle seat console according to the invention makes it possible to tilt the entire vehicle seat connected to the seat-side securing element about the transverse axis by raising up the seat-side securing element in its front area, which element is formed by a seat rail for example. This makes it possible to move the vehicle seat quickly into the rest or reclining position and to move it back equally quickly into the upright sitting position without having to make individual adjustments to the seat position.

Further preferred and advantageous design features of the vehicle seat console according to the invention are described herein.

Preferably, the height adjustment device comprises a multiple-bar linkage with at least one crank which couples together the vehicle structure-side securing element and the seat-side securing element.

It is advantageous in this case for the height adjustment device to have a crank which is arranged between the vehicle structure-side securing element and the front area of the seat-side securing element, and for the two securing elements to be displaceable relative to each other in their rear area.

For this purpose, the seat-side securing element is advantageously mounted in length-adjustable manner by its rear end in or on the vehicle structure-side securing element.

Especially advantageous is a configuration in which the crank is pivot-mounted by a first swivel bearing on the seat-side securing element and by a second swivel bearing on the vehicle structure-side securing element, wherein the first swivel bearing lies in front of the second swivel bearing with respect to the lengthwise extension of the vehicle structure-side securing element when the vehicle seat console assumes a sitting position, and wherein the first swivel bearing lies behind the second swivel bearing with respect to the lengthwise extension of the vehicle structure-side securing element when the vehicle seat console assumes a rest or reclining position.

Especially preferably, the height adjusting element has an electric motorized, a hydraulic, a pneumatic or an electromagnetic drive mechanism.

It is advantageous for the height adjusting element to have a spindle drive.

In another advantageous embodiment of the invention, which can be combined with other described embodiments, the seat-side securing element is coupled in length-adjustable manner to the vehicle structure-side securing element.

The portion of the problem addressed to the vehicle seat console is solved with the vehicle seat having a seat part and a backrest which is attached thereto and which can be moved out of a substantially upright sitting position into a rest or reclined position. For this, the vehicle seat is outfitted with a vehicle seat console configured according to the invention, wherein the seat-side securing element can be tilted about a transverse axis between the upright sitting position and the rest or reclined position. This vehicle seat can be quickly moved with no major adjustment measures between the upright sitting position and a rest or reclined position, without having to change the basic settings of the seat.

Finally, the invention is also addressed to a vehicle, especially a motor vehicle, which is outfitted with at least one such vehicle seat.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 1 is a schematic side view of a vehicle seat with a vehicle seat console according to an embodiment of the invention in the upright sitting position.

FIG. 2 shows the vehicle seat of FIG. 1 in the rest or reclining position.

DETAILED DESCRIPTION OF THE DRAWINGS

FIG. 1 shows a vehicle seat 1, which is mounted by way of a vehicle seat console 2 on the vehicle structure 30 of a vehicle 3.

The vehicle seat 1 comprises a seat part 10 and a swiveling backrest 12 hinged to the seat part. The seat part 10 has a seat bottom 13 provided beneath the seat cushion 11, which is part of a supporting structure of the vehicle seat 1. The seat bottom 13 is connected by two swivel levers 14, 15 to a seat-side securing element 20 of the vehicle seat console 2. The swivel levers 14, 15 can pivot on the seat bottom 13 about a respective axis running parallel to the vehicle transverse axis y. By their respective free end, the swivel levers 14, 15 are mounted in a respective pivot at a distance from each other on the seat-side securing element 20 of the vehicle seat console 2 and can swivel about a transverse axis running parallel to the vehicle transverse axis y.

The seat-side securing element 20 is mounted in or on a structure-side securing element 22 of the vehicle seat console 2 in length adjustable manner, i.e., in the direction of the lengthwise extension of the structure-side securing element 22 of the vehicle seat console 2, forming a seat rail connected to the vehicle structure 30. By means of this length-adjustable mounting, the vehicle seat 1 can be moved in the vehicle lengthwise direction x.

The vehicle seat console 2 is furthermore provided with an asymmetrically acting height adjusting device 24, by which the front portion 20' of the seat-side securing element 20 can be swiveled upward, while the rear portion 20" of the seat-side securing element 20 remains mounted in or on the structure-side securing element 22 fashioned as a rail. The functioning of this height adjusting device 24 shall be explained below with the aid of FIG. 2.

The height adjusting device 24 comprises a crank 23, which couples together the structure-side securing element 22 and the seat-side securing element 20. This coupling may be releasable, in order to make possible a length adjustment of the vehicle seat 1 in the upright sitting position shown in FIG. 1.

The crank 23 is or can be pivot-mounted by a first swivel bearing 23' on the seat-side securing element 20 and by a second swivel bearing 23" on the structure-side securing element 22. In the upright sitting position shown in FIG. 1, the crank 23 extends parallel to the lengthwise direction of both the seat-side securing element 20 and the structure-side securing element 22. In this position, the first swivel bearing 23' lies in front of the second swivel bearing 23", as can be seen in FIG. 1.

If, now, the height adjusting device 24 is activated by way of a drive mechanism (not shown), the crank 23 will swivel upward about the second swivel bearing 23" and then backward, i.e., clockwise in FIG. 1, as symbolized by the arrow a. In this way, the front part 20' of the seat-side securing element 20 decoupled from the structure-side securing element 22 fashioned as a rail will move upward, while the rear end 20" of the seat-side securing element 20 will be shoved backward in the structure-side securing element 22 fashioned as a rail, as symbolized by the arrow b in FIG. 2.

During this movement of the vehicle seat console 2, the vehicle seat 1 will be tilted clockwise, wherein the front end 10' of the seat part 10 will move upward, as indicated by arrow c in FIG. 2, and wherein the upper end 12' of the backrest 12 will move backward and downward, as indicated by arrow d in FIG. 2.

The return movement of the vehicle seat 1 from the rest or reclining position shown in FIG. 2 to the upright sitting position shown in FIG. 1 occurs in the reverse sequence and with accordingly opposite movements.

As can also be seen in FIG. 2, the crank 23 in the rest or reclining position is in an upper dead center position, that is, the crank 23 has been swiveled backward beyond the vertical from its position shown in FIG. 1. The vehicle seat 1 loaded with the weight of a person therefore presses the crank 23 downward in its position represented in FIG. 2, so that a movement of the vehicle seat 1 back to the upright sitting position is only possible by relieving the load on the vehicle seat 1 or by a correspondingly powerful drive mechanism.

Reference numbers in the claims, the description, and the drawings serve only for a better understanding of the invention and should not restrict the scope of its protection.

LIST OF REFERENCE NUMBERS 1 vehicle seat
2 vehicle seat console
3 vehicle
10 seat part
10' front end
11 seat cushion
12 backrest
12' top end
13 seat bottom
14 swivel lever
15 swivel lever
20 securing element
20' front end
20" rear end
22 securing element
23 crank
23' first swivel bearing
23" second swivel bearing
24 height adjustment device
30 vehicle structure
y vehicle transverse axis The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vehicle seat console for a vehicle seat having a seat part and a backrest attached thereto, comprising:
    a vehicle structure-side securing element which is connectable to a vehicle structure;
    a seat-side securing element which is connectable below the vehicle seat; and an asymmetrically acting height adjustment device by which the seat-side securing element is coupled to the vehicle structure-side securing element such that the seat-side securing element is tiltable about a transverse axis, wherein the height adjustment device comprises a multiple-bar linkage with at least one crank which couples together the vehicle structure-side securing element and the seat-side securing element, and the seat-side securing element and the vehicle structure-side securing element are displaceable relative to each other in their rear area.

2. The vehicle seat console according to claim 1, wherein the crank of the height adjustment device is arranged between the vehicle structure-side securing element and a front area of the seat-side securing element.

3. The vehicle seat console according to claim 2, wherein the crank is pivot-mounted by a first swivel bearing on the seat-side securing element and by a second swivel bearing on the vehicle structure-side securing element, the first swivel bearing lies in front of the second swivel bearing with respect to a lengthwise extension of the vehicle structure-side securing element when the vehicle seat console assumes a sitting position, and the first swivel bearing lies behind the second swivel bearing with respect to the lengthwise extension of the vehicle structure-side securing element when the vehicle seat console assumes a rest or reclining position.

4. The vehicle seat console according to claim 2, wherein the seat-side securing element is mounted in a length-adjustable manner by its rear end in or on the vehicle structure-side securing element.

5. The vehicle seat console according to claim 4, wherein the crank is pivot-mounted by a first swivel bearing on the seat-side securing element and by a second swivel bearing on the vehicle structure-side securing element, the first swivel bearing lies in front of the second swivel bearing with respect to a lengthwise extension of the vehicle structure-side securing element when the vehicle seat console assumes a sitting position, and the first swivel bearing lies behind the second swivel bearing with respect to the lengthwise extension of the vehicle structure-side securing element when the vehicle seat console assumes a rest or reclining position.

6. The vehicle seat console according to claim 1, wherein the height adjusting element has an electric motorized, a hydraulic, a pneumatic or an electromagnetic, drive mechanism.

7. The vehicle seat console according to claim 1, wherein the height adjusting element has a spindle drive.

8. The vehicle seat console according to claim 1, wherein the seat-side securing element is coupled in a length-adjustable manner to the vehicle structure-side securing element.

9. The vehicle seat console according to claim 1, further comprising:

a swivel arrangement connected to the seat-side securing element between the seat-side securing element and a seat bottom.

10. A vehicle seat, comprising:

a seat part;

a backrest which is attached to the seat part and is movable out of a substantially upright sitting position into a resting or reclining position; and a vehicle seat console, the vehicle seat console comprising:

a vehicle structure-side securing element which is connectable to a vehicle structure;

a seat-side securing element which is connectable below the vehicle seat; and an asymmetrically acting height adjustment device by which the seat-side securing element is coupled to the vehicle structure-side securing element such that the seat-side securing element is tiltable about a transverse axis between the upright sitting position and the resting or reclining position, wherein the height adjustment device comprises a multiple-bar linkage with at least one crank which couples together the vehicle structure-side securing element and the seat-side securing element, and the seat-side securing element and the vehicle structure-side securing element are displaceable relative to each other in their rear area.

11. A vehicle, comprising at least one vehicle seat according to claim 10.

12. The vehicle according to claim 11, wherein the vehicle is a motor vehicle.

* * * * *